May 13, 1952     G. J. STREZYNSKI     2,596,616
METHOD AND SYSTEM FOR SEPARATING SOLIDS FROM LIQUIDS
Filed April 9, 1951
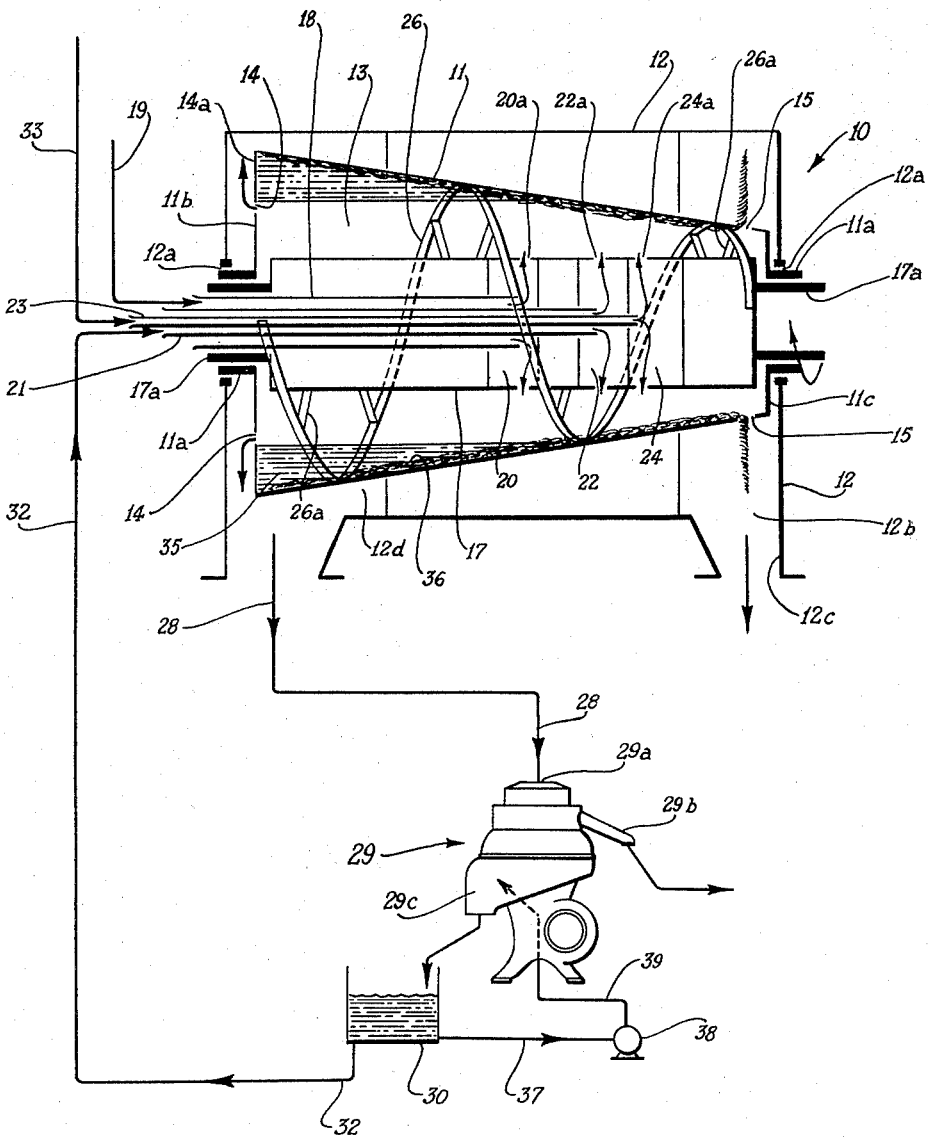
INVENTOR.
George J. Strezynski
BY Patented May 13, 1952

2,596,616

UNITED STATES PATENT OFFICE 2,596,616

METHOD AND SYSTEM FOR SEPARATING SOLIDS FROM LIQUIDS

George J. Strezynski, Poughkeepsie, N. Y., assignor to The De Laval Separator Company, New York, N. Y., a corporation of New Jersey Application April 9, 1951, Serial No. 219,971

11 Claims. (Cl. 233—18)

This invention relates to the separation of solids from liquids of lower specific gravity than the solids and has particular reference to an improved centrifugal method and system for this purpose.

There are many industrial processes in which it is desired to effect a practically complete removal of solids from a liquid at a high throughput rate of the liquid and solid mixture. Centrifuges of the type adapted to separate large volumes of solids from the liquid at a high throughput rate are well known in the art. Due to the high throughput rate of these centrifuges, the separation of the solids from the liquid is by no means complete, and it is a characteristic of centrifuges of this type that the effluent or liquid discharge will contain a high proportion of solids. Accordingly, these centrifuges may be referred to as coarse centrifugal separators, as distinguished from centrifuges of relatively low capacity adapted to discharge an effluent which is substantially free of solids, which may be referred to as fine centrifugal separators.

By combining the coarse centrifugal separator with a fine centrifugal separator, so that the latter receives the effluent from the coarse separator, the final effluent discharge from the fine separator can be made substantially free from the solids. However, even with this combination, there exists the problem of effecting the continuous discharge of the large volume of solids from the coarse centrifugal separator. Since these solids will have a relatively low liquid content, they will generally be in the form of a highly viscous sludge, and the removal of this sludge at the necessary high rate of discharge, without interfering with the operation of the coarse centrifuge, presents considerable difficulties.

The present invention has for its principal object the provision of a centrifugal method and system for separating solids from liquid at a high throughput rate, which not only provide a final effluent substantially free of solids but also facilitate the discharge of the large and viscous mass of solids from the coarse separator.

According to the new method, the mixture of solids and liquid is subjected to coarse centrifugal separating operation to form an outer rotating annulus consisting mainly of relatively coarse solids and an inner rotating annulus consisting mainly of liquid and relatively fine solids. The coarse solids are passed from the outer annulus inward through the liquid annulus and then farther inward along a path removed from the liquid annulus, this inward movement of the solids being effected against the action of centrifugal force, as by means of a mechanical conveyor such as a helical scraper. The coarse solids are then discharged from the centrifugal operation, while liquid from the inner annulus (containing fine solids) is discharged separately. The fine solids in this discharged liquid are then concentrated to form a sludge concentrate containing a relatively small amount of liquid. This concentrate is returned to the centrifugal operation at a point in the above-mentioned path removed from the inner or liquid annulus, and the liquid in the concentrate is passed outward along this path to the liquid annulus under the action of the centrifugal force and in countercurrent to the coarse solids. As a result, the liquid from the sludge concentrate is filtered through the solids in this path on its way to the main body of liquid in the inner annulus, with which it ultimately discharges from the centrifugal operation. At the same time, the fine solids of the sludge concentrate are mixed with and accompany the coarse solids moving inward along this path, thereby facilitating their discharge by making them more fluid.

In the new system, the coarse centrifugal separator has a rotor provided with a chamber having an inlet for the mixture and also having separate outlets for the liquid containing fine solids (effluent) and the coarse solids (sludge), respectively. The sludge outlet is located at a smaller radius from the rotor axis than the effluent outlet, and the separated sludge is transported inwardly from the sludge and effluent annuli to the sludge outlet by means of a conveyor, such as a helical scraper, mounted in the rotor. The effluent outlet from the rotor is connected to the inlet of a fine centrifugal separator, where the effluent is separated into sludge and effluent components. These components are discharged separately from the fine separator, the effluent being substantially free of solids, and the sludge being made up largely of concentrated fine solids. The sludge outlet of the fine separator is connected to an auxiliary feeding device of the coarse separator, which delivers the fine sludge into the rotor chamber. The auxiliary feeding device has its discharge end positioned to discharge the fine sludge into the path of the separated coarse sludge being transported by the conveyor, at a region located between the effluent annulus and the sludge outlet of the rotor. In other words, the returned sludge is not directed into the main body of effluent and sludge in the rotor but bypasses the inner annulus of separated effluent and is deposited upon the discharging coarse sludge after the latter has emerged from the main body of material under separation in the chamber. The fine solids in the recycled sludge are discharged with the coarse solids by the conveyor and serve to make the coarse solids more fluid and thereby facilitate their discharge, while the liquid in the recycled sludge is forced outward by the centrifugal force through the discharging solids, so that the latter is filtered on its way to the main body of effluent in the rotor.

For a better understanding of the invention reference may be had to the accompanying drawing, in which the single illustration is a schematic view of a preferred form of the new centrifugal system.

The new system, as illustrated, comprises a coarse centrifugal separator 10 having a hollow rotor 11 mounted in a stationary housing or frame 12. The rotor is provided at its opposite ends with hollow shafts 11a which are supported for their rotation on a horizontal axis in the housing, it being understood that the shafts 11a are journaled in suitable bearings supported in the housing. The rotor 11 contains a centrifugal separating chamber 13 which tapers from the large end 11b to the small end 11c of the rotor. In the larger end 11b of the rotor are openings 14 forming an effluent outlet from the separating chamber 13; and in the reduced end portion of the rotor are peripheral openings 15 forming a sludge outlet from this chamber. Due to the aforementioned taper, the end of the rotor chamber having the sludge outlets 15 is of considerably smaller radius than the opposite end of the rotor chamber, which has the effluent outlets 14. The periphery of the rotor between the ends 11b and 11c is of frusto-conical form and forms within the rotor chamber a path for movement of separated sludge to the sludge outlets 15, as will be described in greater detail presently. The effluent outlets 14 are located at a radius (from the rotor axis) somewhat greater than the radius of the sludge outlets 15, which means that the separated sludge must be propelled in some manner along the tapering periphery of the rotor in order to discharge through the sludge outlets 15.

A hollow cylindrical distributor 17 is mounted in the rotor 11 and is rotatable relative thereto on the same axis as the rotor. At its opposite ends, the distributor 17 has hollow shafts 17a which support the drum on suitable bearings (not shown) within the rotor shafts 11a. The distributor shafts 17a and the surrounding rotor shafts 11a extend through openings 12a in the opposite ends of the housing 12 and are arranged to be driven so that the rotor 11 rotates at a somewhat higher speed than the distributor 17. An example of a differential driving arrangement for this purpose is disclosed in Patent No. 1,962,461 of E. G. Piper, dated June 12, 1934, this patent also disclosing a suitable bearing assembly for supporting the concentric shafts of the rotor and the distributor, respectively.

The main feed tube 18 extends through the hollow shaft 17a of the distributor at the larger end of the rotor and into the distributor itself, this feed tube forming an inlet to the rotor for the mixture to be separated. The mixture is delivered to the feed tube 18 by a supply pipe 19. The discharge end of this main feed tube terminates in a chamber 20 of the distributor, the latter chamber having peripheral openings 20a through which the mixture from the feed tube passes outward under centrifugal force into the separating chamber 13. The distributor openings 20a are positioned to deliver the mixture to the tapered periphery of the rotor at a region where the periphery is at approximately the same radius as the effluent outlets 14. An auxiliary feed tube 21 is located within the main tube 18 and extends into a second distributing chamber 22 in distributor 17. The chamber 22, at the discharge end of the auxiliary feed tube, has peripheral openings 22a through which the auxiliary feed passes outward under centrifugal force into a part of the separating chamber 13 which is at a smaller radius than the effluent outlets 14. A third feed tube 23, for washing liquid, extends through the auxiliary tube 21 and terminates at its discharge end in a chamber 24 of the distributor 17. The chamber 24 has peripheral openings 24a through which a wash liquid passes under centrifugal force into a part of the separating chamber 13 which has a smaller radius than the part which is fed by the auxiliary feed openings 22a.

A conveyor 26 is mounted in the separating chamber 13 and is rotatable relative to the rotor 11. As shown, the conveyor is in the form of a helix or screw and is secured to the distributor 17 in any suitable manner, as by means of the connections 26a, so that the screw conveyor 26 rotates with the distributor 17. The outer edge of the conveyor 26 is closely adjacent the tapered inner surface of the periphery of the rotor 11, and the conveyor extends from the larger end 11b to the smaller end 11c of the rotor. Since the conveyor screw rotates with the distributor at a lower speed than the rotor 11, it is adapted to transport separated sludge inward along the tapered periphery of the chamber 13 to the sludge outlets 15.

The stationary housing 12 has a collecting chamber 12b which receives the sludge discharged through outlets 15, the sludge being finally discharged from the collecting chamber 12b through a passage 12c. The housing also has a collecting chamber 12d which receives the effluent discharge through outlets 14. This effluent discharge passes from the collecting chamber 12d through a pipe 28 leading to the inlet 29a of a fine centrifugal separator 29. The latter is preferably of the type having spaced conical discs in the separating chamber of the centrifugal bowl, as disclosed, for example, in Strezynski Patent No. 2,500,101, dated March 7, 1950. The centrifuge 29 provides a two-way separation of the effluent from the rotor outlets 14, so that this effluent is separated into a relatively clear effluent, as a lighter component, and a heavier component or sludge containing the concentrated fine solids separated from the effluent. The effluent is discharged through a spout 29b and the sludge is discharged through a separate spout 29c.

The sludge discharge from the fine centrifugal separator 29 is collected in a tank 30, from which it is led through a pipe line 32 to the inlet end of the auxiliary feed tube 21. Accordingly, the sludge from the fine centrifugal separator 29 is returned to the coarse separator 10 by way of the distributing chamber 22a.

In the operation of the new system, the mixture of solids and liquid to be separated is delivered through the feed pipe 19 and the main feed tube 18 into the separating chamber 13 of the coarse separator 10, by way of the distributing chamber 20 and its peripheral openings 20a. This feed accumulates in the peripheral part of the rotor chamber at its larger end portion. Due to the action of centrifugal force in the rotor, the mixture is separated into an inner annulus 35 of effluent and an outer annulus 36 of sludge. The separated effluent from the inner annulus 35 overflows the weir 14a at the larger end of the rotor and discharges continuously through the effluent outlets 14 into the collecting chamber 12d. It will be understood that the radius of the effluent outlets 14a determines the radial position of the inner surface of the effluent annulus 35 in the rotor chamber. Separated sludge in the outer annulus 36 is transported continuously by the screw conveyor 26 along the tapered periphery of the rotorchamber to the sludge outlets 15. In this inward movement of the sludge by the conveyor, it emerges from the inner surface of the effluent annulus 35 at the region where the original feed mixture is delivered into the rotor chamber through the distributor openings 20a. It is then moved by the conveyor along the "dry" periphery of the rotor chamber to the region where the concentrated fine sludge returned from the fine separator 29 is fed into the rotor chamber through the distributing chamber 22. Accordingly, the sludge newly separated in the rotor 13 is joined by the return sludge at this region, and the two sludges are mixed together as they move inward toward the sludge outlets 15 under the action of the screw conveyor. Since the return sludge fed through the distributing chamber 22a consists mainly of concentrated relatively fine solids, it has the effect of reducing the viscosity of the newly separated sludge and facilitating its movement to and through the outlets 15 by the conveyor. Liquid accompanying the concentrated fine sludge from separator 29 is displaced outward by the centrifugal force in rotor 11 and along the "dry" path of the coarse solids in countercurrent thereto, there being sufficient clearance between the helical scraper 26 and the outer wall of chamber 13 to permit this counterflow of the liquid. The coarse solids therefore serve to filter the counterflowing liquid on its way to the effluent annulus 35.

The concentrated mixed solids passing through the discharge passage 12c of the coarse separator 10 may be processed in any suitable manner. The clarified liquid phase, which is discharged from the system through the spout 29b, may be led to a waste receptacle or subjected to further processing.

If desired, the final water washing of the solids may be effected before they are discharged through the passage 12c. For this purpose, water is fed through a pipe 33 into the central or wash liquid feed pipe 23. Thus, the wash liquid is directed upon the sludge in the chamber 13 at a region located beyond the region where the return sludge is joined with the newly separated sludge, reckoned in the direction of sludge movement for the outlets 15.

The solids discharged from the fine separator 29 may, if desired, be further concentrated by recirculating this sludge through the separator 29. As shown, the re-circulation circuit of the separator 29 comprises a pipe 37 leading from the bottom of collecting tank 30 to a pump 38. The latter serves to return some of the sludge into the peripheral portion of the centrifugal bowl of the separator 29, by way of a pipe 39 leading into the bowl. A recirculation arrangement suitable for this purpose is disclosed in Strezynski Patent No. 2,500,101.

It will be apparent from the foregoing that the new system not only provides a substantially clear effluent from the discharge spout 29b of the fine separator, but also facilitates the discharge of the sludge from the coarse separator 10, due to the effect of the fine solids returned to the latter separator by way of the auxiliary feed tube 21. Because of the location of the discharge end of this auxiliary feed tube, the returned sludge bypasses the separated effluent in the annulus 35 and therefore does not place an additional load on the separating capacity of the coarse centrifuge 10. In the illustrated embodiment of the invention, this bypassing of the separated effluent is caused by feeding the return sludge against the newly separated sludge being transported by the conveyor 26, at a region where the radius of the tapered chamber is less than the radius of the effluent outlets 14. In other words, the return sludge joins the newly separated sludge at a region between the effluent annulus 35 and the sludge outlets 15.

The coarse separator 10 is preferably of the "Bird" type, examples of which are disclosed in Patents Nos. 1,710,315 dated April 23, 1929 and 1,962,461 dated June 12, 1934. As previously mentioned, centrifuges of this type have a high throughput capacity but a relatively low separating efficiency as compared with centrifuges of the "disc" type, such as the separator 29, which has a relatively low throughput rate but a high separating efficiency. For some purposes, it may be desirable to provide the bowl of the fine separator 29 with valves (not shown) at the peripheral outlets of the bowl and operate the valves so as to discharge the sludge intermittently from the bowl. An intermittently operated valve arrangement of this type is disclosed, for example in Strezynski Patent No. 2,488,746, dated November 22, 1949.

While I have illustrated the coarse centrifuge 10 as having a frusto-conical rotor 11, the latter may be substantially cylindrical as long as its sludge outlet is at a smaller radius than its effluent outlet, so that the coarse sludge is carried through the effluent annulus 35 by the conveyor and moved against the centrifugal force along a substantially dry path on its way to the sludge outlet.

The method of the invention comprises passing the coarse sludge inward from annulus 36 through the inner or effluent annulus 35 and thence farther inward along a substantially dry path against the centrifugal force in the rotor, concentrating the fine solids in the effluent discharge through outlet 14, and returning this fine concentrate or sludge to the coarse centrifuging operation at a point in the "dry" path of the coarse sludge removed from the effluent annulus, the liquid in the fine sludge flowing under centrifugal force countercurrently to the coarse solids and being filtered by the latter before reaching the effluent annulus 35, and the fine solids in the returned sludge being mixed with the coarse sludge transported by the conveyor so as to facilitate discharge of the coarse sludge. Thus, the process may be practiced by a system other than that disclosed herein, as, for example, by a system in which the fine solids in the effluent from the coarse separator are concentrated by gravity settling, filtering, or other means, rather than by the fine centrifugal separator 29.

I claim:

1. A centrifugal system for separating solids from liquid of lower specific gravity than the solids, which comprises a coarse centrifugal separator having a rotor provided with a chamber for separating the mixture of liquids and solids into an outer annulus of sludge and an inner annulus of effluent, the rotor chamber having an inlet for receiving the mixture and also having separate outlets for effluent and sludge, respectively, the sludge outlet being located at a smaller radius from the rotor axis than the effluent outlet, a conveyor mounted in the rotor and operable to transport separated sludge inwardly from the sludge annulus and the effluent annulus to the sludge outlet, a fine centrifugal separator having a lower throughput capacity than the first separator and having an inlet, an effluent outlet and a sludge outlet, a pipe connection between said effluent outlet of the first centrifuge and said inlet of the second centrifuge, an auxiliary feeding device extending into said rotor and having its discharge end positioned to discharge material into the path of separated sludge being transported by said conveyor, at a region between the effluent annulus and said first sludge outlet, and a return pipe line leading from the sludge outlet of the second centrifuge to said auxiliary feeding device.

2. A system according to claim 1, in which said conveyor is a helical scraper mounted for rotation relative to the rotor.

3. A system according to claim 1, in which the rotor chamber tapers toward its sludge outlet and away from its effluent outlet, the auxiliary feeding device having its discharge end positioned to discharge material upon a wall of the chamber located at a radius from said axis less than the radius of said first effluent outlet from the axis.

4. A system according to claim 1, comprising also a main feeding device extending through the rotor inlet and having its discharge end positioned to discharge material into said effluent annulus.

5. A system according to claim 1, comprising also a wash liquid tube extending into the rotor and having its discharge end positioned to discharge liquid into the path of separated sludge being transported by the conveyor, at a region intermediate said first region and said first sludge outlet.

6. A system according to claim 1, comprising also a recirculation pipe leading from the sludge outlet of the second centrifuge into said last centrifuge and by-passing said inlet thereof.

7. A centrifugal system for separating solids from liquid of lower specific gravity than the solids, which comprises a centrifugal rotor having a separating chamber provided with an inlet for the liquid and solids mixture, one end of the chamber being of substantially smaller radius than the other end, the chamber having at its larger end an effluent outlet and at its smaller end a sludge outlet, the sludge outlet being at a smaller radius from the rotor axis than the effluent outlet, the rotor chamber having an outer wall forming a sludge path leading inward to the sludge outlet, a conveyor mounted in the rotor and operable to transport separated sludge inward along said path to the sludge outlet, a centrifugal separator having an inlet and also having a sludge outlet and an effluent outlet, a pipe connection between the effluent outlet of the rotor chamber and said separator inlet, and sludge return means for delivering material from the sludge outlet of said separator to said sludge path at a region located at a smaller radius from the rotor axis than said first effluent outlet.

8. A system according to claim 7, comprising also a feed tube extending into the rotor chamber through said first inlet, for feeding said mixtures into the rotor, said return means including an auxiliary feed tube extending into the rotor, the discharge end of the auxiliary tube being spaced along the rotor axis toward said first sludge outlet, from the discharge end of the other tube.

9. A system according to claim 7, comprising also a feed tube extending into the rotor chamber through said first inlet, for feeding said mixture into the rotor, said return means including an auxiliary feed tube extending into the rotor, the discharge end of the auxiliary tube being spaced along the rotor axis toward said first sludge outlet, from the discharge end of the other tube, and a wash liquid tube extending into the rotor and having its discharge end spaced along the rotor axis toward said first sludge outlet, from the discharge end of the auxiliary tube.

10. In the separation of solids from liquid of lower specific gravity than the solids, the method which comprises subjecting the mixture of solids and liquid to a coarse centrifugal separating operation wherein there is formed an outer rotating annulus mainly of relatively coarse solids and an inner rotating annulus mainly of liquid and relatively fine solids, passing said coarse solids inwardly through said liquid annulus and thence inwardly along a path removed therefrom, against the action of the centrifugal force in said operation, and then discharging the coarse solids from said operation, separately discharging the liquid with its fine solids from said inner annulus and the centrifugal operation, concentrating the fine solids in said discharged liquid to form a sludge concentrate containing a relatively small amount of liquid, returning the sludge concentrate to the centrifugal operation at a point in said path removed from the inner annulus of liquid, and passing the liquid in said concentrate outward along said path and into said inner annulus in countercurrent to said coarse solids and under the action of said centrifugal force, whereby said last liquid is filtered through the solids in said path.

11. In the separation of solids from liquid of lower specific gravity than the solids, the method which comprises subjecting the mixture of solids and liquid to a coarse centrifugal separating operation wherein there is formed an outer rotating annulus mainly of relatively coarse solids and an inner rotating annulus mainly of liquid and relatively fine solids, passing said coarse solids inwardly through said liquid annulus and thence inwardly along a path removed therefrom, against the action of the centrifugal force in said operation, and then discharging the coarse solids from said operation, separately discharging the liquid with its fine solids from said inner annulus and the centrifugal operation, concentrating the fine solids in said dicharged liquid to form a sludge concentrate containing a relatively small amount of liquid, returning the sludge concentrate to the centrifugal operation at a point in said path removed from the inner annulus of liquid, and mixing the sludge concentrate with the coarse solids in said path to facilitate discharge of the coarse solids from the centrifugal operation.

GEORGE J. STREZYNSKI.

REFERENCES CITED

The following references are of record in the file of this patent:

UNITED STATES PATENTS

| Number | Name | Date |
|---|---|---|
| 1,381,706 | Hapgood | June 14, 1921 |
| 2,085,537 | Lyons | June 29, 1937 |
| 2,488,747 | Strezynski | Nov. 22, 1949 |
| 2,526,292 | Staaf | Oct. 17, 1950 |
| 2,528,974 | Ritsch | Nov. 7, 1950 |